US012330917B2

(12) United States Patent
Aguado-Martin

(10) Patent No.: US 12,330,917 B2
(45) Date of Patent: Jun. 17, 2025

(54) SAFETY BRAKE SYSTEM

(71) Applicant: Otis Elevator Company, Farmington, CT (US)

(72) Inventor: Jose Miguel Aguado-Martin, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/499,602

(22) Filed: Nov. 1, 2023

(65) Prior Publication Data

US 2024/0059526 A1 Feb. 22, 2024

Related U.S. Application Data

(62) Division of application No. 17/828,826, filed on May 31, 2022, now Pat. No. 11,827,494.

(30) Foreign Application Priority Data

Aug. 23, 2021 (EP) .................................... 21382775

(51) Int. Cl.
*B66B 5/22* (2006.01)
*B66B 5/06* (2006.01)

(52) U.S. Cl.
CPC . *B66B 5/22* (2013.01); *B66B 5/06* (2013.01)

(58) Field of Classification Search
CPC ................ B66B 5/22; B66B 5/20; B66B 5/06
See application file for complete search history.

(56) References Cited

U.S. PATENT DOCUMENTS

2023/0055159 A1 2/2023 Aguado-Martin

FOREIGN PATENT DOCUMENTS

| | | | | |
|---|---|---|---|---|
| CN | 113830643 A | 12/2021 | | |
| EP | 3112306 A1 | 1/2017 | | |
| EP | 3281905 A2 | 2/2018 | | |
| EP | 3604196 A1 | 2/2020 | | |
| EP | 3608273 A1 * | 2/2020 | ............. | B66B 17/12 |
| EP | 3677534 A1 | 7/2020 | | |
| WO | 2005044709 A1 | 5/2005 | | |

(Continued)

OTHER PUBLICATIONS

Machine Translation of CN 110342367.*
European Search Report for application EP 21382775.1, dated Jan. 21, 2022, 8 pages.

*Primary Examiner* — Diem M Tran
(74) *Attorney, Agent, or Firm* — CANTOR COLBURN LLP

(57) ABSTRACT

A safety brake system for use in a conveyance system. The safety brake system includes a guide rail and a conveyance component moveable along the guide rail. The safety brake system includes: a safety brake moveable between a non-braking position where the safety brake is not in engagement with the guide rail and a braking position where the safety brake is engaged with the guide rail; a linkage mechanism; and an actuator for the safety brake. The actuator is configured to be mounted to the conveyance component. The actuator includes an electromagnet switchable between a first state and a second state; and an actuation component configured to move relative to the electromagnet from a first position when the electromagnet is in the first state to a second position when the electromagnet is in the second state.

17 Claims, 9 Drawing Sheets

(56) References Cited

FOREIGN PATENT DOCUMENTS

| | | | | |
|---|---|---|---|---|
| WO | WO-2017098299 | A1 * | 6/2017 | ............. B66B 5/044 |
| WO | WO-2021099562 | A1 * | 5/2021 | ............... B66B 5/22 |
| WO | 2021160815 | A1 | 8/2021 | |

* cited by examiner

SAFETY BRAKE SYSTEM

FOREIGN PRIORITY

This application is a divisional of U.S. patent application Ser. No. 17/828,826, filed May 31, 2022, the entire contents of which is incorporated herein by reference, which claims priority to European Patent Application No. 21382775.1, filed Aug. 23, 2021, and all the benefits accruing therefrom under 35 U.S.C. § 119, the contents of which in its entirety are herein incorporated by reference.

TECHNICAL FIELD

This disclosure relates to a safety brake system for use within a conveyance system such as an elevator system, and to a method of operating a safety brake in a safety brake system.

BACKGROUND

Many elevator systems include a hoisted elevator car, a counterweight, a tension member which connects the hoisted elevator car and the counterweight, and a sheave that contacts the tension member. During operation of such an elevator system, the sheave may be driven by a machine to move the elevator car and the counterweight through the hoistway, with their movement being guided by guide rails. Typically a governor is used to monitor the speed of the elevator car. According to standard safety regulations, such elevator systems must include an emergency braking device (known as a safety brake or “safety gear”) which is capable of stopping the elevator car from moving downwards, even if the tension member breaks, by gripping a guide rail.

The risks associated with freefall of an elevator car in an elevator system are particularly acute for elevator systems employed in high-rise buildings, where more significant over speed may occur due to the increased drop. The actuation of the safety brake is usually mechanically controlled. An elevator system employing a mechanical governor and mechanically-actuated safety brake is shown in FIG. 1, and described in greater detail below.

Electromechanical actuators have also been proposed, wherein a safety controller is in electrical communication with an electromagnetic component that can be controlled to effect movement of the safety brake via a mechanical linkage. It is an aim of the present disclosure to provide an improved safety brake system.

SUMMARY

According to a first aspect of this disclosure there is provided a safety brake system for use in a conveyance system including a guide rail and a conveyance component moveable along the guide rail, the safety brake system comprising: a safety brake moveable between a non-braking position where the safety brake is not in engagement with the guide rail and a braking position where the safety brake is engaged with the guide rail; a linkage mechanism; and an actuator for the safety brake, the actuator being configured to be mounted to the conveyance component and comprising: an electromagnet switchable between a first state and a second state; and an actuation component configured to move relative to the electromagnet from a first position when the electromagnet is in the first state to a second position when the electromagnet is in the second state, wherein the linkage mechanism is coupled between the safety brake and the actuation component such that movement of the actuation component from the first position to the second position when the electromagnet is switched from the first state to the second state is transferred to the safety brake via the linkage mechanism, thus moving the safety brake into the braking position.

Thus it will be appreciated by those skilled in the art that, if the electromagnet is switched from the first to the second state, for example if the conveyance component is detected to be moving too fast or accelerating at too great of a rate, the actuation component will move from the first position to the second position, thus moving relative to the electromagnet. The movement of the actuation component is transferred via the linkage mechanism so as to move the safety brake into the braking position. Thus, it will be understood that the linkage mechanism, which is coupled between the safety brake and the actuation component, is configured to move together with the actuation component thereby moving the safety brake into the braking position to engage with the guide rail and stop motion of the component.

The disclosed safety brake system may require fewer components than prior art mechanical safety brake devices which may therefore reduce the space required by the safety brake system. In addition, the reduction in the number of components may reduce the cost of installation and service. The disclosed safety brake system may further provide a system which is simple to maintain and provides robust performance.

It will further be understood that, in some examples of the disclosed safety brake system, there is no dependence on frictional forces to actuate the safety brake. Rather, the linkage mechanism may be caused to move to actuate the safety brake as a direct result of the movement of the actuation component, in other words, by the movement of the actuation component from the first position to the second position when the electromagnet is switched from the first state to the second state being transferred to the safety brake via the linkage mechanism.

It will be understood that the actuation component may for example be spaced apart from the electromagnet in the first position and then in contact with the electromagnet when in the second position or may be spaced apart from the electromagnet in both the first position and in the second position. In any example of the disclosure, the actuation component may be in contact with the electromagnet when in the first position and may be spaced apart from the electromagnet when in the second position.

In prior art mechanical safety brake devices, resetting the safety brake to the non-braking position after use can be complex and may, for example, involve realignment of the actuator and the safety brake before it is possible to reset the safety brake.

In one set of examples, the electromagnet may be switchable between the second state and a third state; the actuation component may be configured to move relative to the electromagnet from the second position when the electromagnet is in the second state to the first position when the electromagnet is in the third state; and the linkage mechanism may be coupled between the safety brake and the actuation component such that movement of the actuation component from the second position to the third position is transferred to the safety brake via the linkage mechanism, thus moving the safety brake to the non-braking position. In one set of examples, the third state may be the same as the first state. In an alternative set of examples the third state may be different to the first state.

In this set of examples, the safety brake may be reset automatically when the electromagnet is switched from the second state to the third state. In some examples, the safety brake might be reset only be switching the electromagnet from the second state to the third state. In any example of the disclosure however, to reset the safety brake from the braking position to the non-braking position, the conveyance component may optionally be moved along the guide rail in a direction opposite to the direction of movement of the conveyance component during a freefall, over-speed, or over-acceleration condition prior to or simultaneously with the electromagnet being switched from the second state to the third state so as to reset the safety brake. This may reduce the magnitude of the force required to be produced by the actuator to reset the safety brake.

In a set of examples, the electromagnet is fixed relative to the conveyance component. In one set of examples, the electromagnet could be fixed directly to the conveyance component. In an alternative set of examples however, the actuator may further comprise a mount portion for mounting the actuator to the conveyance component, and the electromagnet may be fixed relative to the mount portion.

The safety brake may be mounted to the conveyance component independently of the actuator, with the linkage mechanism extending between the safety brake and the actuator. However, in a set of examples, the mount portion also mounts the safety brake to the component such that the safety brake system is a single integrated unit or device. This arrangement is advantageous as the safety brake system may be provided as one unit which may be affixed to a conveyance component in a single installation step.

The mount portion could take any desired form. Thus, for example, the mount portion could comprise a flat plate. The mount portion could also be configured for mounting the safety brake to the conveyance component. In an alternative example, the mount portion could be provided by a housing of the actuator.

In a set of examples, the actuator may comprise a housing, wherein the housing encloses the electromagnet and the actuation component. The housing may protect the actuator from damage, for example due to becoming blocked with debris. The housing may further be configured so as to guide movement of the actuation component between the first position and the second position.

In one set of examples, the housing may be configured to be mounted directly to the conveyance component. In an alternative set of examples, the housing may be mounted to a further component of the safety brake system such as, for example, a mount portion configured to be mounted to the conveyance component.

It will be appreciated that the linkage mechanism could be configured such that movement of the actuation component in any direction could move the safety brake into the braking position. In one set of examples however, the safety brake may comprise a braking component configured to move into engagement with the guide rail when the safety brake moves to the braking position, and the braking component may be coupled to the linkage mechanism such that the movement of the actuation component from the first position to the second position when the electromagnet is switched from the first state to the second state pushes or pulls the braking component in the direction of movement of the actuation component, thus moving the safety brake into the braking position. In this set of examples, the force required to be exerted on the actuation component to move the safety brake into the braking position may be relatively low, thus improving the efficiency of the safety brake system.

In one set of examples of the disclosure, the actuator may further comprise a safety lever, the safety lever being fixed to the actuation component for movement therewith and extending from the electromagnet to the actuation component along a lever axis, wherein the actuation component is configured to move between the first position and the second position along the lever axis.

In one set of examples, the movement of the actuation component from the first position to the second position when the electromagnet is switched between the first and second states may push or pull the braking component along a braking axis, and the braking axis may be in-line with the lever axis. In an alternative set of examples, the linkage mechanism may be configured such that the braking axis is off-set from the lever axis. In any example of the disclosure, the braking axis may extend parallel to the lever axis or approximately parallel to the lever axis (where approximately means within + or −5°).

In one set of examples, the safety lever may be formed as a continuation of the linkage mechanism. In other words, the safety lever and the linkage mechanism may comprise a single component. In another set of examples, the safety lever may be a separate component from the linkage mechanism. In these examples, the safety lever and the linkage mechanism may be connected to one another via a pivoting joint.

The electromagnet could take any suitable form. In one set of examples of the disclosure, the electromagnet may be a solenoid and the actuation component may be a permanent magnet.

In one set of examples, the solenoid may be energised with a first polarity when in the first state and with a second, opposite polarity when in the second state. In these examples, the solenoid may be energised with the first polarity when in the third state such that the third state is the same as the first state.

In another set of examples, the solenoid may be powered off when in the first state and energised with a first polarity when in the second state. It will be understood that in this set of examples, the solenoid may be energised with a second, opposite polarity when in the third state or it may be powered off such the third state is the same as the first state. In the examples in which the solenoid is powered off in the first state, the energy requirements during normal operation of the safety brake system are reduced as the solenoid may be operated with pulses of power to engage the safety brake instead of a continuous power supply.

In any example of the disclosure in which the electromagnet comprises a solenoid, the actuator may further comprise: a second actuation component fixed to the safety lever so as to move with the actuation component, wherein the actuation component may comprise a first permanent magnet, wherein the electromagnet may be positioned axially between the first permanent magnet and the second actuation component, wherein the second actuation component may comprise a second permanent magnet, wherein the first and the second permanent magnets may have opposite polarities.

In one set of examples, the first magnet is attracted towards the solenoid when the solenoid is in the first state and repulsed away from the solenoid when the solenoid is in the second state; and the second magnet may be attracted towards the solenoid when the solenoid is in the second state.

In a set of examples, the second magnet may further be repulsed away from the solenoid when the solenoid is in the first state.

It will be understood that, in this set of examples, when the solenoid is powered off in the first state, the magnetic forces between the solenoid and the first and/or second permanent magnets may occur due to magnetic forces between the first and/or second permanent magnets and a steel core of the solenoid without additional forces exerted by an electromagnetic field generated by the solenoid when energised.

In an alternative set of examples of the disclosure, the actuation component may comprise a ferromagnetic material, and the actuator may be configured such that in the first state the electromagnet attracts the actuation component to the electromagnet and wherein in the second state, the electromagnet does not attract the actuation component to the electromagnet. In an alternative in this set of examples of the disclosure, the actuator may be configured such that in the first state the electromagnet does not attract the actuation component to the electromagnet and wherein in the second state, the electromagnet attracts the actuation component to the electromagnet.

In any example of the disclosure, the actuation component may be configured to move relative to the electromagnet due to the force exerted by the electromagnet alone. In one set of examples however, the actuator may further comprise a biasing member configured to bias the actuation component away from or towards the electromagnet. The biasing member may be a spring or any other resilient member which can be configured to provide the biasing force to move the actuation component along the longitudinal axis in a direction away from or towards the electromagnet.

In a set of examples, the safety brake comprises a wedge brake. Some suitable wedge brake arrangements include a roller mounted to move relative to a wedge, or one or more wedge-shaped brake pads mounted to move into engagement with a guide rail. However, the safety brake may comprise any suitable arrangement for stopping motion of a component via mechanical engagement with a guide rail.

In examples of the present disclosure, the safety brake device may find use in a variety of conveyance systems, such as elevator systems, people conveyors, goods transporters, etc. The conveyance component that is moveable along a guide rail may be a platform, a counterweight or a cab for transporting goods or people. In some examples, the conveyance system is an elevator system and the conveyance component is an elevator car.

According to some further examples of the present disclosure, there is provided an elevator system comprising: an elevator car driven to move along at least one guide rail; and the safety brake system of any of the examples described above, wherein the electromagnet is fixed relative to the elevator car and the safety brake is arranged to be moveable between the non-braking position where the safety brake is not in engagement with the guide rail and the braking position where the safety brake is engaged with the guide rail. In such examples, the safety brake may be mounted to the elevator car independently of the actuator, or together with the actuator, for example, via the mounting portion.

In a set of examples, the elevator system comprises a speed sensor and a safety controller arranged to receive a speed signal from the speed sensor and to selectively switch the electromagnet from the first state to the second state upon detecting an overspeed or over-acceleration condition for the elevator car based on the speed signal. It will be appreciated that acceleration may be determined through processing of the speed signal to produce an acceleration signal e.g. by differentiating the speed signal.

In a set of examples, in addition or alternatively, the elevator system comprises an accelerometer and a safety controller arranged to receive an acceleration signal from the accelerometer and to selectively switch the electromagnet from the first state to the second state upon detecting an over-acceleration condition for the elevator car.

Therefore, when the elevator car is travelling at overspeed or over-acceleration, selectively switching the electromagnet from the first state to the second state will actuate the safety brake to engage with the guide rail, preventing further motion of the elevator car.

According to a second aspect of the present disclosure, there is provided a method of operating a safety brake in a safety brake system, the safety brake system comprising: a safety brake moveable between a non-braking position where the safety brake is not in engagement with the guide rail and a braking position where the safety brake is engaged with the guide rail; a linkage mechanism; and an actuator for the safety brake, the actuator being mounted to the conveyance component and comprising: an electromagnet switchable from a first state to a second state; and an actuation component configured to move relative to the electromagnet between a first position when the electromagnet is in the first state and a second position when the electromagnet is in the second state, the method comprising: operating the electromagnet in an emergency stop mode to move the actuation component from the first position to the second position, wherein the linkage mechanism is coupled between the safety brake and the actuation component such that the movement of the actuation component from the first position to the second position is transferred to the safety brake via the linkage mechanism, thus moving the safety brake into the braking position.

In a set of examples, the method may further comprise: detecting an overspeed or over-acceleration of the component; and initiating the emergency stop mode by switching the electromagnet from the first state to the second state.

In a set of examples, the method may further comprise initiating a reset of the safety brake system by switching the electromagnet from the second state to a third state so as to move the actuation component from the second position when the electromagnet is in the second state to the first position when the electromagnet is in the third state, wherein the linkage mechanism is coupled between the safety brake and the actuation component such that the movement of the actuation component from the second position to the first position is transferred to the safety brake via the linkage mechanism, thus moving the safety brake into the non-braking position.

In this set of examples, the safety brake may be reset automatically when the electromagnet is switched from the second state to the third state. Initiating a reset of the safety brake may further comprise moving the conveyance component along the guide rail in a direction opposite to the direction of movement of the conveyance component during a freefall, over-speed, or over-acceleration condition prior to or simultaneously to the electromagnet being switched from the second state to the third state so as to reset the safety brake. This may reduce the magnitude of the force required to be produced by the actuator to reset the safety brake.

In one set of examples, the third state may be the same as the first state. In an alternative set of examples the third state may be different to the first state. In either set of examples, the electromagnet may comprise a solenoid. The solenoid may be powered off in the first state and powered on in the second and third states. The solenoid may be powered on with the same or opposite polarities in the second and third states.

In a set of examples, the method may further include moving a braking component of the safety brake into engagement with the guide rail when the safety brake moves to the braking position, wherein the braking component is coupled to the linkage mechanism such that the movement of the actuation component from the first position to the second position when the electromagnet is switched between the first and second states pushes or pulls the braking component in the direction of movement of the actuation component, thus moving the safety brake into the braking position In a set of examples, the actuator may further comprise a safety lever, the safety lever being fixed to the actuation component for movement therewith and extending from the electromagnet to the actuation component along a lever axis, and the operating the electromagnet in the emergency stop mode to move the actuation component from the first position to the second position may comprise moving the actuation component between the first position and the second position along the lever axis.

In a set of examples, operating the electromagnet in the emergency stop mode to move the actuation component from the first position to the second position may push or pull the braking component along a braking axis, wherein the braking axis is in-line with the lever axis, or wherein the braking axis is off-set from the lever axis.

In a set of examples, operating the electromagnet in an emergency stop mode may further include moving a second actuation component of the actuator, wherein the electromagnet is a solenoid and wherein the actuation component is a first permanent magnet, wherein the second actuation component is fixed to the safety lever so as to move with the first actuation component, wherein the electromagnet is positioned axially between the first actuation component and the second actuation component, wherein the second actuation component comprises a second permanent magnet, wherein the first and the second permanent magnets have opposite polarities such that the first magnet is attracted towards the solenoid when the solenoid is in the first state and repulsed away from the solenoid when the solenoid is in the second state; and wherein the second magnet is attracted towards the solenoid when the solenoid is in the second state. The second magnet may further be repulsed away from the solenoid when the solenoid is in the first state.

According to some further examples of the present disclosure, there is provided a method of operating an elevator system, the method comprising driving an elevator car to move along at least one guide rail and operating the safety brake in the safety brake system, wherein the electromagnet is fixed relative to the elevator car and the safety brake is arranged to be moveable between the non-braking position where the safety brake is not in engagement with the guide rail and the braking position where the safety brake is engaged with the guide rail.

As mentioned above, such methods may find use in a variety of conveyance systems, but in at least some examples the methods are used to operate a safety brake in a safety brake device in an elevator system and the conveyance component is an elevator car.

DETAILED DESCRIPTION

Figure 1:
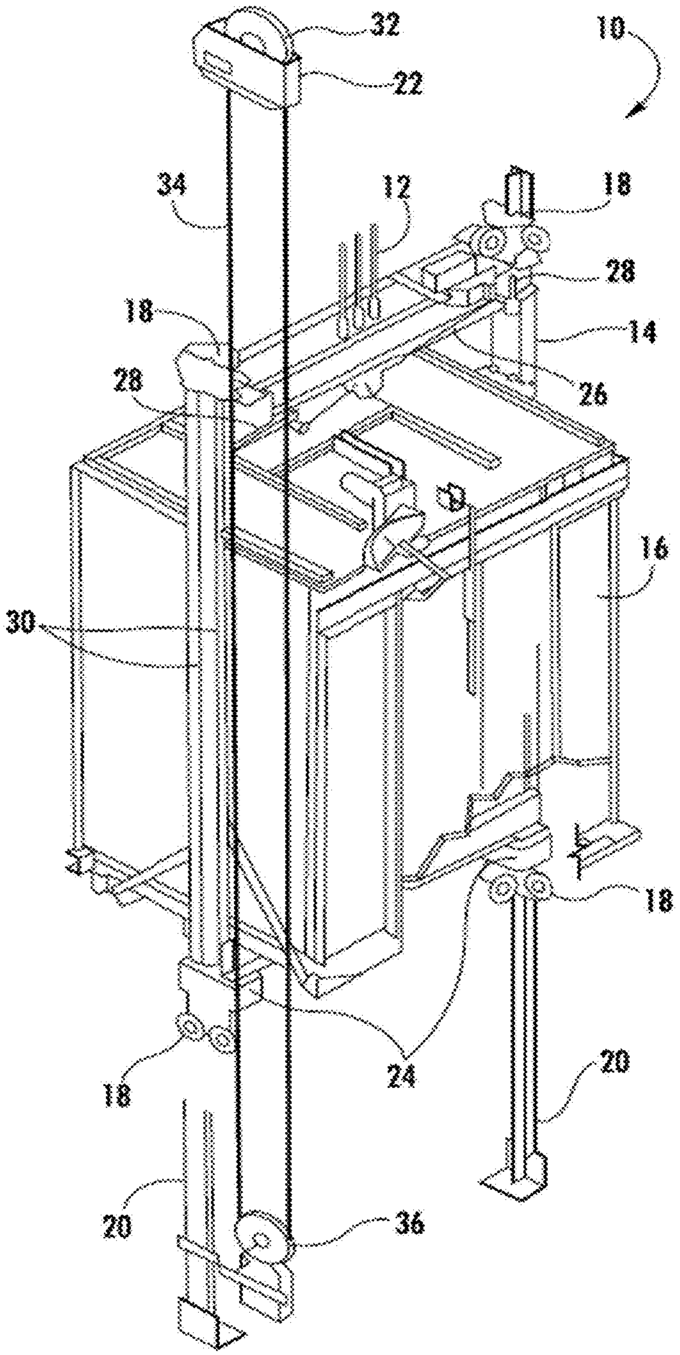
FIG. 1 is a schematic diagram of an elevator system employing a mechanical governor.

FIG. 1 shows a conveyance system, in this example an elevator system, generally indicated at 10. The elevator system 10 includes cables or belts 12, a car frame 14, a conveyance component, in this example an elevator car 16, roller guides 18, guide rails 20, a governor 22, and a pair of safety brakes 24 mounted on the elevator car 16. The governor 22 is mechanically coupled to actuate the safety brakes 24 by linkages 26, levers 28, and lift rods 30. Governor 22 includes a governor sheave 32, rope loop 34, and a tensioning sheave 36. Cables 12 are connected to car frame 14 and a counterweight (not shown in FIG. 1) inside a hoistway. Elevator car 16, which is attached to car frame 14, moves up and down the hoistway by force transmitted through cables or belts 12 to car frame 14 by an elevator drive (not shown) commonly located in a machine room at the top of the hoistway. Roller guides 18 are attached to car frame 14 to guide the elevator car 16 up and down the hoistway along the guide rails 20. Governor sheave 32 is mounted at an upper end of the hoistway. Rope loop 34 is wrapped partially around governor sheave 32 and partially around tensioning sheave 36 (located in this example at a bottom end of the hoistway). Rope loop 34 is also connected to elevator car 16 at lever 28, ensuring that the angular velocity of governor sheave 32 is directly related to the speed of elevator car 16.

In the elevator system 10 shown in FIG. 1, the governor 22, a machine brake (not shown) located in the machine room, and the safety brakes 24 act to stop the elevator car 16 if it exceeds a set speed as it travels inside the hoistway. If elevator car 16 reaches an over-speed or over-acceleration condition, the governor 22 is triggered initially to engage a switch, which in turn cuts power to the elevator drive and drops the machine brake to arrest movement of the drive sheave (not shown) and thereby arrest movement of elevator car 16. If, however, the elevator car 16 continues to experience an over speed condition, governor 22 may then act to trigger the safety brakes 24 to arrest movement of elevator car 16. In addition to engaging a switch to drop the machine brake, governor 22 also releases a clutching device that grips the governor rope 34. Governor rope 34 is connected to the safety brakes 24 through mechanical linkages 26, levers 28, and lift rods 30. As elevator car 16 continues its descent, governor rope 34, which is now prevented from moving by actuated governor 22, pulls on the operating levers 28. The operating levers 28 actuate the safety brakes 24 by moving linkages 26 connected to lift rods 30, which lift rods 30 cause the safety brakes 24 to engage the guide rails 20 to bring the elevator car 16 to a stop.

Mechanical speed governor systems are being replaced in some elevators by electronically-actuated systems. A safety brake system 40 is described herein that is suitable for electronic or electrical control of actuating and resetting a safety brake in an elevator system. It will be understood that the safety brake system of the present disclosure could be used in an elevator system 10 of the type shown in FIG. 1. However, this is only one example of a system in which the safety brake of the disclosure could be used. The safety brake system of the present disclosure could also be used in any other suitable type of elevator system. Such other types of elevator system may include (but are not limited to) hydraulic elevator systems and ropeless elevator systems such as pinched wheel or linear motor propulsion elevator systems.

Figure 2B:
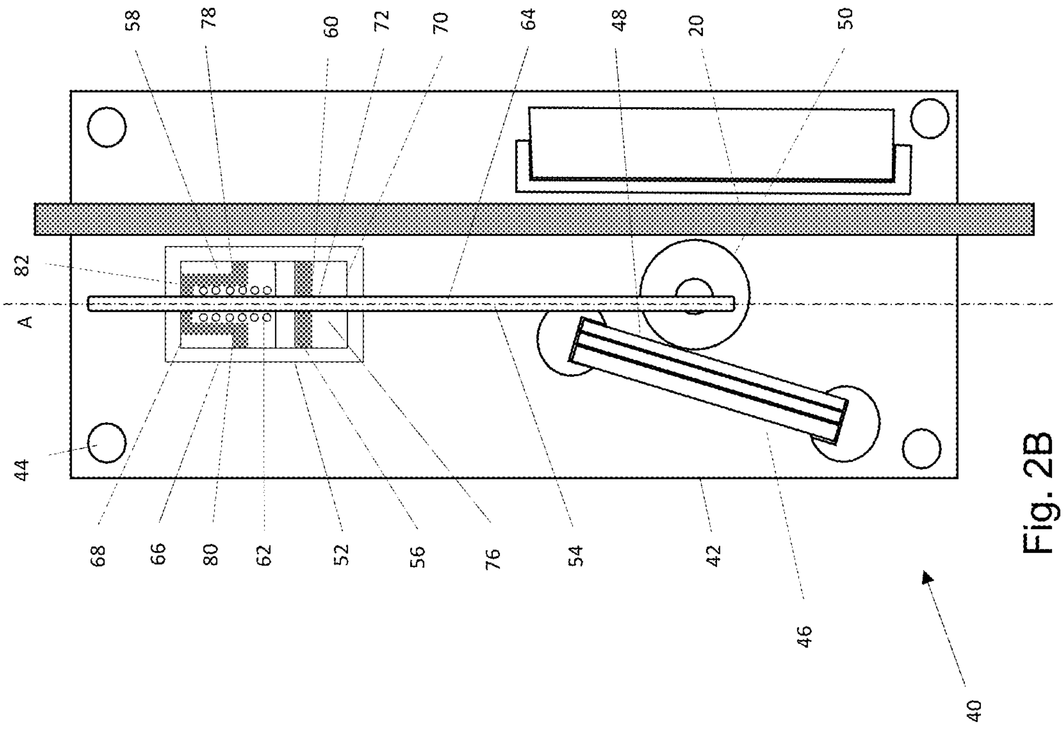
FIG. 2B is a schematic cross-sectional view of the safety brake system of FIG. 2A in a second, braking position.
Figure 2A:
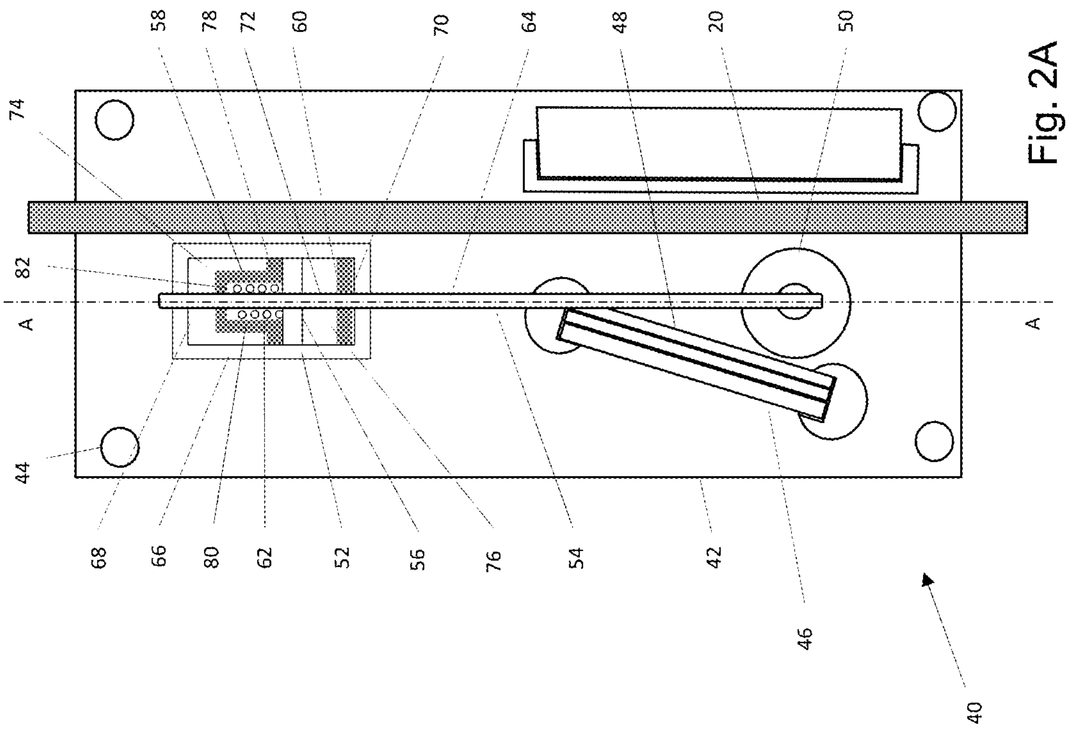
FIG. 2A is a schematic cross-sectional view of a safety brake system according to an example of the present disclosure with the safety brake in a first, non-braking position.

FIGS. 2A and 2B show an example of a safety brake system 40 with the safety brake 46 in a first, non-braking position and a second, braking position respectively. The safety brake system 40 can be mounted onto the elevator car 16 of FIG. 1 to actuate the safety brake without relying on a mechanical coupling to the governor 22. The safety brake system 40 includes a mount 42 which may be mounted on the external surface of the elevator car 16. The mount 42 includes apertures 44 which enable fixation of the mount 42 to the elevator car frame 14 (as seen in FIG. 1).

The safety brake system 40 comprises a safety brake 46 which is moveable between a non-braking position where the safety brake 46 is not in engagement with the guide rail 20, and a braking position where the safety brake 46 is engaged with the guide rail 20. The safety brake 46 is illustrated as a wedge-type safety brake comprising an angled "wedge" surface 48 which is fixed relative to the mount 42 and a roller 50 moveable along the surface from a non-braking position (as seen in FIG. 2A) to a braking position where the roller 50 is brought into engagement with the guide rail 20 (as seen in FIG. 2B). Such wedge-type safety brakes are well-known in the art, for example as seen in U.S. Pat. No. 4,538,706. However, it will be appreciated that the safety brake 46 may take any suitable form and could instead comprise any suitable form of braking component including a wedge-shaped brake pad, or a magnetic brake pad instead of the roller. Further, the safety brake 46 could comprise first and second rollers or brake pads adapted to be brought into engagement with the guide rail on first and second opposite sides thereof.

Regardless of the exact form of the safety brake 46, the safety brake 46 is coupled to an actuator 52 via a linkage mechanism 54. The actuator 52 comprises an electromagnet switchable between a first state and a second state and an actuation component configured to move relative to the electromagnet along an axis between a first position when the electromagnet is in a first state and a second position when the electromagnet is in a second state. The actuation component is therefore configured to provide movement of the linkage mechanism 54, thus moving the safety brake 46 between the non-braking and braking positions.

In the example of FIGS. 2A and 2B, as described below, the electromagnet is a solenoid 56 and the actuation component comprises a first permanent magnet 58. The actuator further comprises a second permanent magnet 60 and a spring 62.

The linkage mechanism 54 is coupled at one end to the roller 50 and extends along an axis 64 parallel to or within 10° of parallel to the guide rail 20. As seen, the safety brake 46 is located below the actuator 52 in this example such that the linkage mechanism 54 can act to pull the roller 50 upwardly along the "wedge" surface 48 to move the safety brake 46 into the braking position. The roller 50 in the example shown is pulled upwardly along a braking axis, which in the example shown corresponds to the axis 64.

Figure 2C:
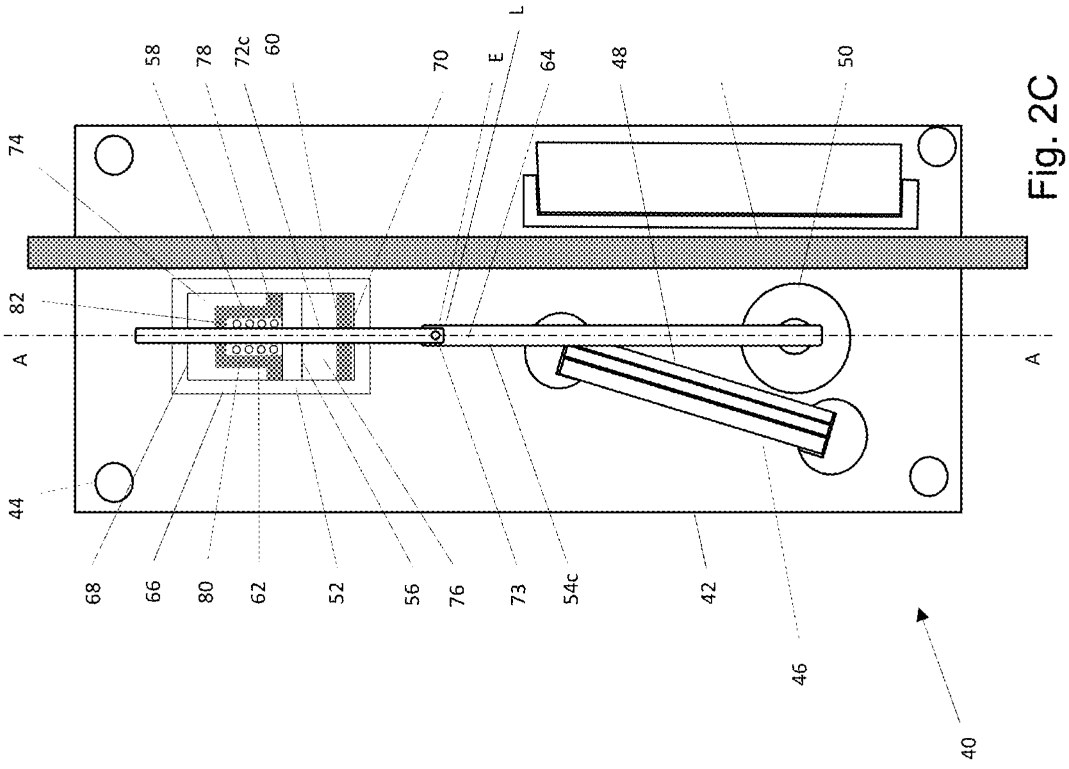
FIG. 2C is a schematic cross-sectional view of the safety brake system of FIG. 2A with the safety brake in the same position as that of FIG. 2A but with an alternative linkage mechanism.

The actuator 52 further includes a housing 66 which is fixed to the mount 42 and encloses the solenoid 56, the first permanent magnet 58, the second permanent magnet 60 and the spring 62. The housing 66 may take any suitable shape and, in the example shown, comprises a cylindrical hollow body, having a longitudinal axis A-A and first and second closed ends 68, 70. A safety lever 72 is provided, which in the example of FIGS. 2A and 2B, is formed as a continuation of the linkage mechanism 54. In any example of the disclosure and as shown in FIG. 2C (in which components which correspond to those of FIG. 2A are shown with like reference numbers), the safety lever 72*c* may alternatively be a separate component from the linkage mechanism 54*c*. As seen, one end E of the safety lever 72*c* is coupled to the end L of the linkage mechanism 54*c* which is not coupled to the roller 50 via a pivoting joint 73.

In the example of FIGS. 2A-2C, the safety lever 72 extends into the housing 66 through the first closed end 68 thereof along a lever axis, which in the example shown corresponds to the longitudinal axis A-A of the housing and through the second closed end 70 thereof.

The solenoid 56 may take any suitable shape and, in the example shown, is disc shaped. The solenoid is fixed in position relative to the housing 66 and thus is also fixed relative to the elevator car 16. In the example shown, the solenoid 56 extends across the full internal diameter of the housing 66, the perimeter of the disc shaped solenoid engaging with the inner wall of the housing 66. The safety lever 72 extends through an aperture (not shown) in the solenoid and can move axially relative thereto. The solenoid 56 is spaced from both the first and second closed ends 68, 70 of the housing such that a first chamber 74 is formed between the first closed end and the solenoid 56 and a second chamber 76 is formed between the second closed end and the solenoid 56.

The safety lever 72 extends through the first and second permanent magnets 58, 60. The safety lever 72 is fixed to the first permanent magnet 58 and to the second permanent magnet 60 such that the safety lever 72, the first permanent magnet 58 and the second permanent magnet 60 are configured to move simultaneously and together along the axis 64 relative to the solenoid 56. The solenoid 56 is positioned axially between the first permanent magnet 58 and the second permanent magnet 60 such that the first permanent magnet 58 is positioned in the first chamber 74 and the second permanent magnet 60 is positioned in the second chamber 76.

The first permanent magnet 58 comprises a flange, in the example shown, an annular flange 78, the perimeter of which engages with the inner wall of the housing 66. A body, a cylindrical body 80 in the example shown, extends axially away from a radially inner edge of the annular flange 78 and is closed at an opposite end 82 thereof. The spring 62, which is a helical compression spring in the example shown, is housed in the body 80 of the first permanent magnet 58 and extends between the solenoid 56 and the closed end 82 of the first permanent magnet 58. The spring is biased to push the first permanent magnet 58 away from the solenoid 56 along the axis 64. The safety lever 72 extends though the centre of the spring 62 such that buckling of the spring may be restricted by the safety lever 72.

FIG. 2A shows the safety brake system 40 in a non-braking position, e.g. upon installation or after reset. In this position, the first permanent magnet 58 is held in contact with the solenoid 56 by the magnetic force between the first permanent magnet 58 and the solenoid 56. In this regard, the magnetic force between the first permanent magnet 58 and the solenoid 56 is configured to oppose and overcome the biasing force provided by the spring 62. The second permanent magnet 60 is held in a position spaced apart from the solenoid 56 by the magnetic force between the second permanent magnet 60 and the solenoid 56. It will be appreciated that in this and other examples, the first and the second permanent magnets are configured such that when one of the first and second permanent magnets is attracted towards the solenoid 56, the other one of the first and the second permanent magnets is repulsed away from the solenoid 56. In this example, the solenoid 56 is energised with a positive polarity when the safety brake system 40 is in a non-braking position. In other examples, the solenoid 56 may be energised with a negative polarity when the safety brake system 40 is in a non-braking position.

A controller 84 (shown in FIG. 8) is in electrical communication with the solenoid 56. In the example shown, in normal operating conditions, the solenoid 56 is energised with a positive polarity. If a freefall, over-speed, or over-acceleration condition of the elevator car 16 is detected by the governor 22, the controller 84 is configured to switch the solenoid 56 to be energised with a negative polarity, such that the first permanent magnet 58 is moved away from the solenoid 56 along the axis 64 from a first axial position to a second axial position by the repulsive magnetic force between the first permanent magnet 58 and the solenoid 56.

In the example of FIGS. 2A and 2B, the first permanent magnet 58 is stopped by and/or rests against the first closed end 68 of the housing when in the second axial position. The biasing force provided by the spring 62 acts in the same direction as the repulsive magnetic force between the first permanent magnet 58 and the solenoid 56 and so also acts to move the first permanent magnet 58 away from the solenoid 56. At the same time, the second permanent magnet 60 is moved towards the solenoid 56 along the axis 64 by an attractive magnetic force between the second permanent magnet 58 and the solenoid 56. In other words, the safety lever 72 is moved along the axis 64 in the direction of travel of the first and second permanent magnets by the net balance of the biasing force provided by the spring 62, the repulsion force between the first permanent magnet 58 and the solenoid 56 and the attraction force between the second permanent magnet 60 and the solenoid 56.

The safety lever 72 is continuous with or coupled to the linkage mechanism 54 as described above in relation to FIGS. 2A-2C. The linkage mechanism 54 is linked to the roller 50 or a similar component of the safety brake 46 such that the movement of the safety lever 72 pulls the roller 50 or other safety brake component upwardly in the example shown (but more generally in a direction opposite to the direction of movement of the elevator car during a freefall, over-speed, or over-acceleration condition) thus moving the safety brake 46 into the braking position such that it engages the guide rail and prevents further downwards motion of the elevator car 16. In other words, the safety brake 46 is actuated as a result of the solenoid 56 being switched by the controller 84 from a first state where the solenoid 56 is energised with a positive polarity to a second state where the solenoid 56 is energised with a negative polarity.

To reset the safety brake 46 and the actuator 52 of the safety brake system 40 from the braking to the non-braking position, the solenoid 56 is switched to be energised with a positive polarity by the controller 84, creating an attractive magnetic force between the first permanent magnet 58 and the solenoid 56 and a repulsive magnetic force between the second permanent magnet 60 and the solenoid 56. The biasing force provided by the spring 62 opposes movement of the first permanent magnet 58 towards the solenoid 56. The attractive magnetic force between the first permanent magnet 58 and the repulsive magnetic force between the second permanent magnet 60 and the solenoid 56 overcome the biasing force provided by the spring 62 and the first permanent magnet 58 is moved into contact with the solenoid 56. In this and other examples, the elevator car 16 may optionally be moved along the guide rail in a direction opposite to the direction of movement of the elevator car during a freefall, over-speed, or over-acceleration condition prior to the solenoid 56 being switched by the controller 84 to reset the safety brake. Moving the elevator car as described reduces the magnitudes of forces required to be generated by the actuator 52. It will be understood however that in some examples, the elevator car may not be moved as described prior to the solenoid 56 being switched by the controller 84 to reset the safety brake.

Figure 3B:
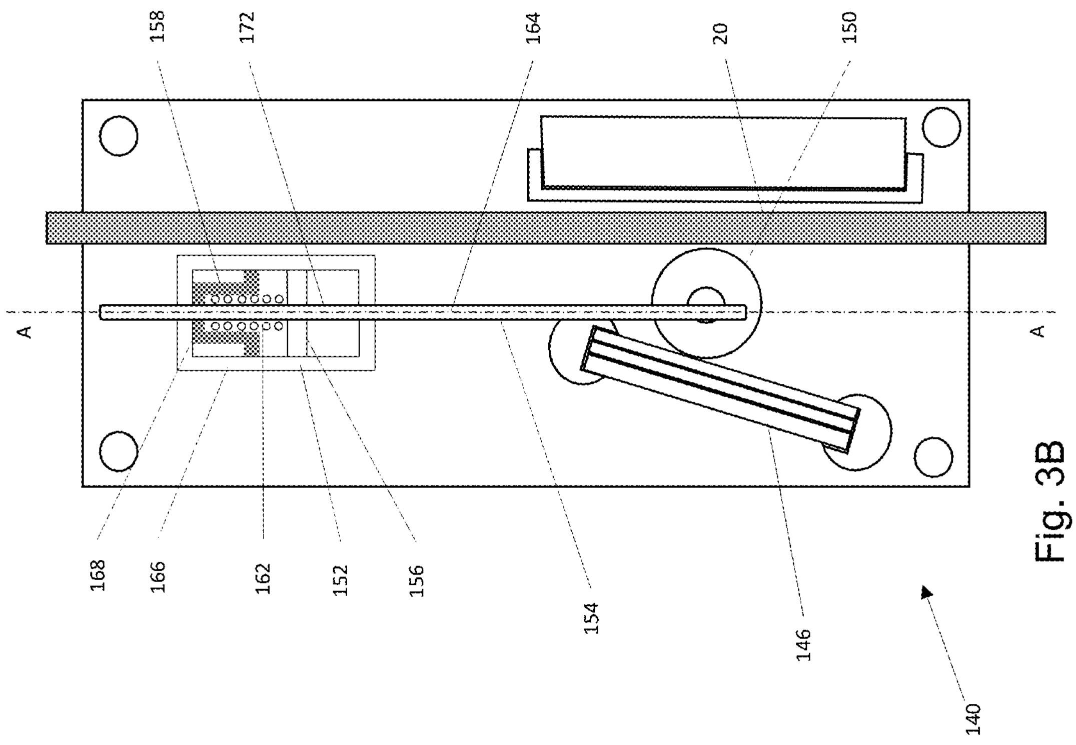
FIG. 3B is a schematic cross-sectional view of the safety brake system of FIG. 3A in a second, braking position.
Figure 3A:
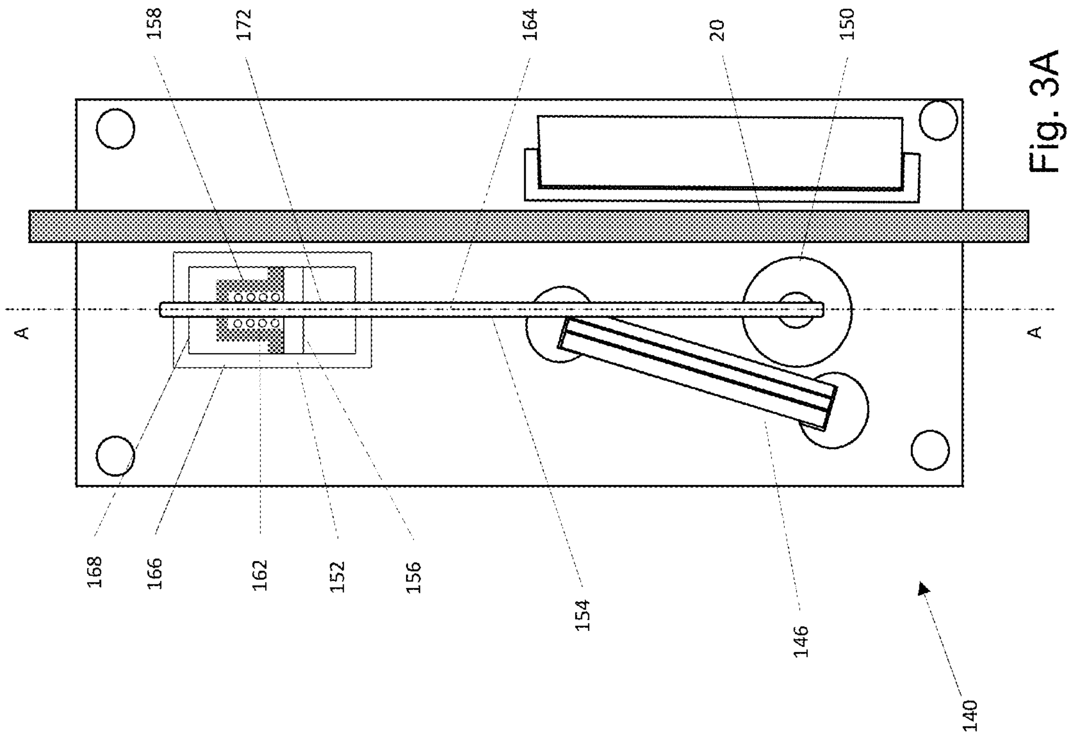
FIG. 3A is a schematic cross-sectional view of a safety brake system according to a second example of the present disclosure with the safety brake in a first, non-braking position.

A further example of the safety brake system is shown in FIGS. 3A and 3B. FIGS. 3A and 3B are shown in the frame of reference of the elevator car 16. The safety brake system 140 displayed in FIGS. 3A and 3B uses the same mechanism as the safety brake system 40 in FIGS. 2A and 2B to engage the safety brake 146. However, in the example of FIGS. 3A and 3B the actuator comprises only a first permanent magnet 158 and a spring 162. Thus, no second permanent magnet is included in this version of the actuator 152.

FIG. 3A shows the safety brake system 140 in a non-braking position, e.g. upon installation or after reset. In this position, the first permanent magnet 158 is held in contact with the solenoid 156 by the magnetic force between the first permanent magnet 158 and the solenoid 156. In this regard, the magnetic force between the first permanent magnet 158 and the solenoid 156 is configured to oppose and overcome the biasing force provided by the spring 162. In this example, the solenoid 156 is energised with a positive polarity. In other examples, the solenoid 156 may be energised with a negative polarity when the safety brake system 140 is in a non-braking position.

A controller 84 (shown in FIG. 8) is in electrical communication with the solenoid 156. In the example shown, in normal operating conditions, the solenoid 156 is energised with a positive polarity. If a freefall, over-speed, or over-acceleration condition of the elevator car 16 is detected by the governor 22, the controller 84 is configured to switch the solenoid 156 to be energised with a negative polarity, such that the first permanent magnet 158 is moved away from the solenoid 156 along the axis 164 from a first axial position to a second axial position by the repulsive magnetic force between the first permanent magnet 158 and the solenoid 156. In the example of FIGS. 3A and 3B, the first permanent magnet 158 is stopped by and/or rests against the first closed end 168 of the housing 166 when in the second axial position. The biasing force provided by the spring 162 acts in the same direction as the repulsive magnetic force between the first permanent magnet 158 and the solenoid 156 and so also acts to move the first permanent magnet 158 away from the solenoid 156. In other words, the safety lever 172 is moved along the axis 164 in the direction of travel of the first permanent magnet 158 by the net balance of the biasing force provided by the spring 162 and the repulsion force between the first permanent magnet 158 and the solenoid 156.

To reset the safety brake 146 and the actuator 152 of the safety brake system 140 from the braking to the non-braking position, the solenoid 156 is switched to be energised with a positive polarity by the controller 84, creating an attractive magnetic force between the first permanent magnet 158 and the solenoid 156. The biasing force provided by the spring 162 opposes movement of the first permanent magnet 158 towards the solenoid 156. The attractive magnetic force between the first permanent magnet 158 overcomes the biasing force provided by the spring 162 and the first permanent magnet 158 is moved into contact with the solenoid 156. Thus, movement of the first permanent magnet 158 back to its non-braking position will move the safety lever 172 such that the safety lever 172 pushes the roller 150 or other safety brake component downwardly thus moving the safety brake 146 back into the non-braking position such that it disengages from the guide rail 20. In this and other examples, the elevator car 16 may optionally be moved along the guide rail in the direction opposite to the direction of movement of the elevator car during a freefall, over-speed, or over-acceleration condition prior to the solenoid 156 being switched to be energised with a positive polarity by the controller 84. It will be understood however that in this and other examples, the elevator car may not be required to be moved prior to the solenoid 56 being switched by the controller 84 to reset the safety brake.

Figure 4B:
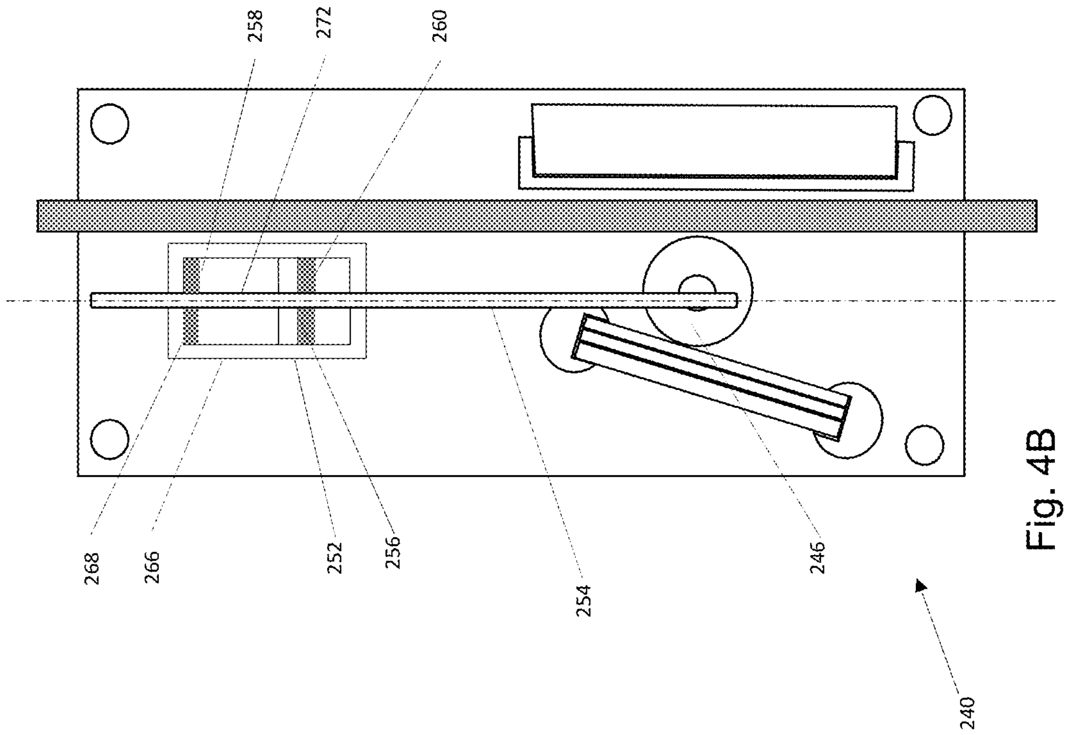
FIG. 4B is a schematic cross-sectional view of the safety brake system of FIG. 4A in a second, braking position.
Figure 4A:
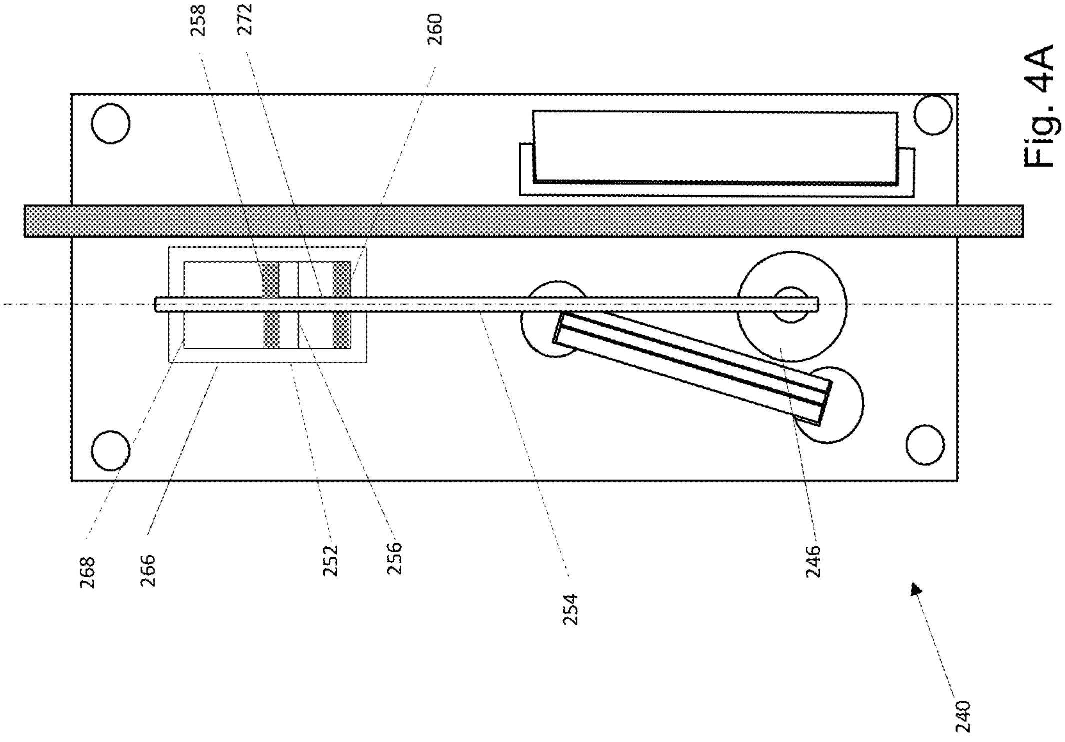
FIG. 4A is a schematic cross-sectional view of a safety brake system according to a third example of the present disclosure with the safety brake in a first, non-braking position.

A third example of the safety brake system is shown in FIGS. 4A and 4B. FIGS. 4A and 4B are shown in the frame of reference of the elevator car 16. The safety brake system 240 displayed in FIGS. 4A and 4B uses the same mechanism as the safety brake system 40 in FIGS. 2A and 2B to engage the safety brake 246. However, the example of FIGS. 4A and 4B, does not comprise a spring in another version of the actuator 252. Thus movement of the first permanent magnet 258 relative to the solenoid 256 is caused by a repulsive force generated between the first permanent magnet 258 and the solenoid 256 when the solenoid is switched from a first state to a second state. It will be understood that the first permanent magnet 258 could take any suitable form. In the example shown, the first permanent magnet 258 is disc shaped and is configured such that an upper surface of the first permanent magnet 258 rests against the first closed end 268 of the housing 266 when in the second axial position.

It will further be understood that the safety brake system 240 of this example may comprise both a first and a second permanent magnet 258, 260 or a first permanent magnet only.

Figure 5B:
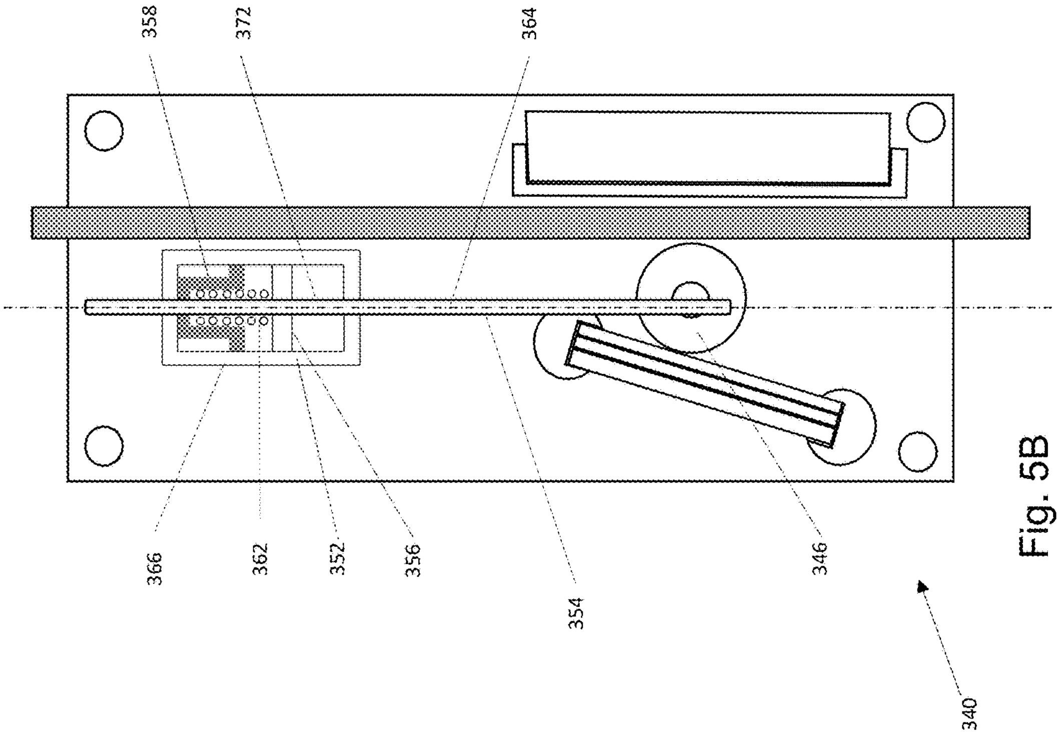
FIG. 5B is a schematic cross-sectional view of the safety brake system of FIG. 5A in a second, braking position.
Figure 5A:
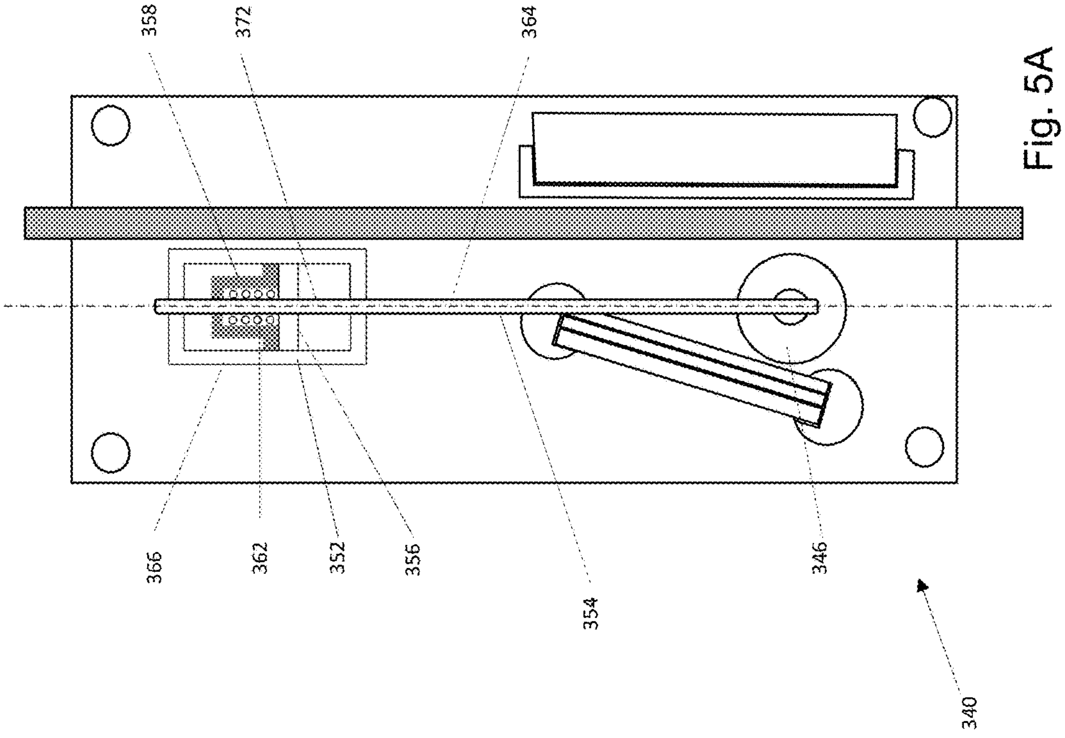
FIG. 5A is a schematic cross-sectional view of a safety brake system according to a fourth example of the present disclosure with the safety brake in a first, non-braking position.

A fourth example of the safety brake system is shown in FIGS. 5A and 5B. FIGS. 5A and 5B are shown in the frame of reference of the elevator car 16. The safety brake system 340 displayed in FIGS. 5A and 5B uses the same mechanism as the safety brake system 40 in FIGS. 2A and 2B to engage the safety brake 346. However, in the example of FIGS. 5A and 5B the actuator 352 comprises an electromagnet 356 rather than a solenoid and the actuation component 358 comprises a ferromagnetic component which may have the same shape as the first permanent magnet 58 of the example of FIGS. 2A and 2B. The actuator 352 further comprises a spring 362 and a safety lever 372 as in the example of FIGS. 2A and 2B.

The electromagnet 356 is fixed in position relative to the housing 366 and relative to the elevator car 16. The safety lever 372 and the actuation component 358 move relative to the electromagnet 356. The safety lever 372 extends through the electromagnet 356, through the actuation component 358 and through the housing 366. The safety lever 372 has an axis 364 and is fixed to the actuation component 358 such that the safety lever 372 and the actuation component 358 move simultaneously and together along the axis 364.

FIG. 5A shows the safety brake system 340 in a non-braking position, e.g. upon installation or after reset. The electromagnet is powered on such that the actuation component 358 is held in contact with the electromagnet 356 by the magnetic force provided by the electromagnet 356 which overcomes the biasing force provided by the spring 362. A controller 84 (seen in FIG. 8) is in electrical communication with the electromagnet 356 and is configured to control a supply of electricity to the electromagnet 356.

If a freefall, over-speed, or over-acceleration condition of the elevator car 16 is detected by the governor 22, the controller (seen in FIG. 8) removes or reduces electrical power to the electromagnet 356 so as to switch the electromagnet from a first state to a second state. On removal or reduction of power to the electromagnet 356, the actuation component 358 is released by the electromagnet. When the actuation component 358 is released, the biasing force applied by the spring 362 to the actuation component 358 acts to move the actuation component 358 away from the electromagnet 356 along the axis 364 from a first axial position to a second axial position. The safety lever 372 moves with the actuation component 358. The safety lever 372 is linked to the safety brake 346 such that the movement of the safety lever 372 pulls the safety brake thus moving the safety brake 346 into the braking position. In other words, the safety brake 346 is actuated as a result of the electromagnet 356 being switched between a first state where the electromagnet 356 is powered on and a second state where the power supplied to the electromagnet 356 is removed or reduced.

To reset the safety brake 346 and the actuator 352 of the safety brake system 340, the controller restores or increases power to the electromagnet 356 creating an attractive magnetic force between the electromagnet 356 and the actuation component 358. The attractive magnetic force overcomes the biasing force provided by the spring 362 and as a result the actuation component 358 moves towards the electromagnet along the axis 364 from the second axial position to the first axial position. In this and other examples, the elevator car 16 may optionally be moved along the guide rail in the direction opposite of the direction of movement of the elevator car during a freefall, over-speed, or over-acceleration condition prior to power being restored to electromagnet 356 by the controller 84.

Figure 6:
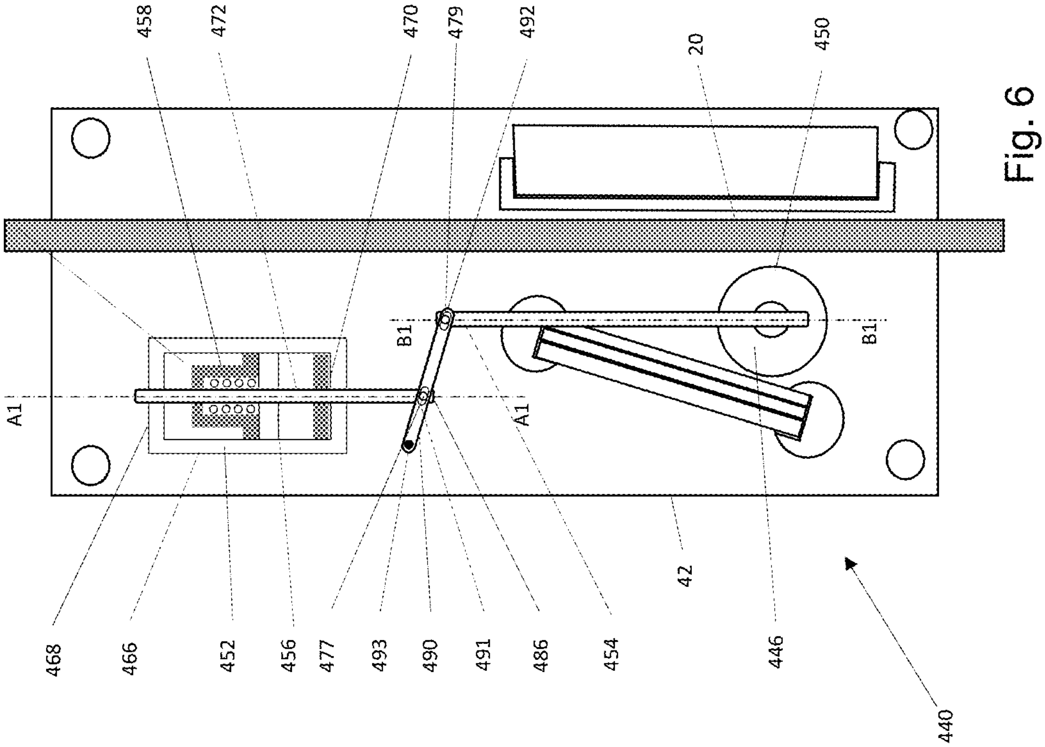
FIG. 6 is a schematic cross-sectional view of a safety brake system according to a fifth example of the present disclosure with the safety brake in a first, non-braking position.

A further example of the safety brake system is shown in FIG. 6 in the frame of reference of the elevator car 16. The safety brake system 440 displayed in FIG. 6 uses the same actuator and the same safety brake as the safety brake system 40 in FIGS. 2A and 2B. However, in the example of FIG. 6 the safety lever 472 of the actuator 452 is not continuous with the linkage mechanism 454.

The housing 466 comprises a hollow body, having a longitudinal axis A1-A1 and first and second closed ends 468, 470. In the example shown, the hollow body is cylindrical but it will be understood that it could be any other suitable shape such as cuboid or rectangular cuboid for example. The safety lever 472 extends into the housing 466 through the first closed end 468 thereof along the longitudinal axis A1-A1 of the housing 466 and through the second closed end 470 thereof. A first end 486 of the safety lever 472 is located between the housing 466 and the safety brake 446. A pivot linkage 490 connects the first end 486 of the safety lever 472 to the end of the safety brake linkage mechanism 454 which is not coupled to the roller 450. The end of the linkage mechanism 454 which is not coupled to the roller 450 extends through a second longitudinal axis B1-B1 parallel to and offset from the first longitudinal axis A1-A1 of the safety lever 472. The end of the safety lever 472 is coupled to the pivot linkage 490 via a first fastener 477 such as a pin extending through a first slot 491 extending longitudinally along the pivot linkage 490 approximately midway along the pivot linkage 490. The end of the linkage mechanism 454 which is not coupled to the roller 450 is coupled to the pivot linkage 490 via a second fastener 479 such as a pin extending through a second slot 492 extending longitudinally along the pivot linkage 490 at an end thereof. An opposite end of pivot linkage 490 is attached to mount 42 via a pin 493 forming a pivoting point such that movement of the safety lever 472 along the first longitudinal axis A1-A1 causes safety lever 472 to move within the first slot 491 thus rotating pivot linkage 490 about pivoting point. The rotation of pivot linkage 490 in turn causes the linkage mechanism 454 to move within the second slot 492 and to move along the second longitudinal axis B1-B1. In other words, the pivot linkage 490 is configured so as to cause movement of the safety lever 472 along the first longitudinal axis A1-A1 to move the linkage mechanism 454 along the second longitudinal axis B1-B1 in the same direction.

Figure 7:
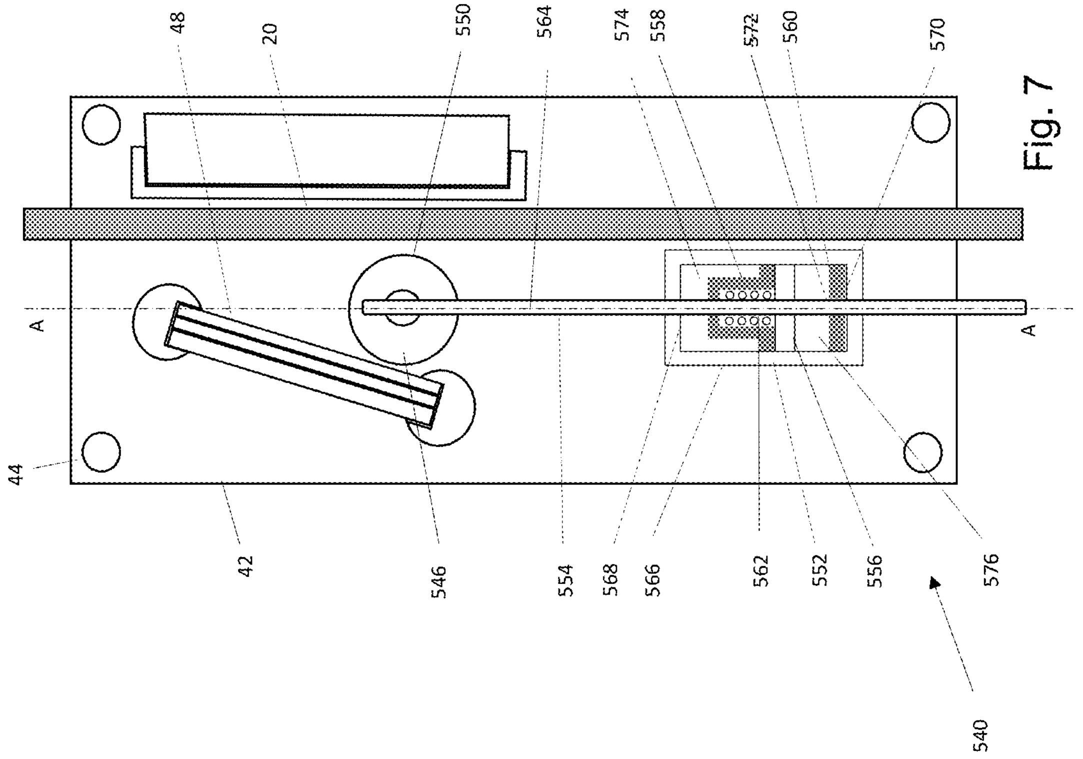
FIG. 7 is a schematic cross-sectional view of a safety brake system according to a sixth example of the present disclosure with the safety brake in a first, non-braking position.

In all the examples of FIGS. 2A to 6, the actuator 52, 152, 252, 352, 452 is shown as being mounted above the safety brake 46, 146, 246, 346, 446 such that the safety lever 72, 72*c* 172, 272, 372, 472 acts to pull the safety brake upwardly to engage the safety brake. It will be understood however that, in any example of the disclosure, the safety brake could be mounted above the actuator such that the safety lever acts to push the safety brake upwardly to engage the safety brake. Such an arrangement is shown in the example of FIG. 7 in which components which correspond to those of FIG. 2A are shown with like reference numbers, which is again shown in the frame of reference of the elevator car 16. In this example, the linkage mechanism 554 is coupled at one end to the roller 550 and extends along an axis 564 parallel to or within 10° of parallel to the guide rail 20. As seen, the safety brake 546 is located above the actuator 552 in this example such that the linkage mechanism 554 can act to push the roller 550 upwardly along the "wedge" surface 48 to move the safety brake 546 into the braking position. The roller 550 in the example shown is pushed upwardly along a braking axis, which in the example shown corresponds to the axis 564. The safety brake system 540 displayed in FIG. 7 again uses the same actuator and the same safety brake as the safety brake system 40 in FIGS. 2A and 2B.

Further, all the examples shown are configured for vertical movement of the elevator car 16 along a guide rail. It will be appreciated however that the examples of the disclosure could equally apply to an elevator or conveyance system in which the conveyance component is configured to move horizontally or in another non-vertical direction.

In an alternative set of examples of operating any safety brake system 40, 140, 240, 440, 540, including an actuator having a solenoid (for example as shown in FIGS. 2A-2C, 3A-3B, 4A-4B, 6 and 7) the solenoid 56, 156, 256, 456, 556 is powered off in normal operating conditions. In other words, when the safety brake system 40, 140, 240, 440, 540 is in a non-braking-position, e.g., upon installation or after reset, no power is supplied to the solenoid 56, 156, 256, 456, 556 by the controller 84. In this position, the first permanent magnet 58, 158, 258, 458, 558 is held in contact with the solenoid 56, 156, 256, 456, 556 by the magnetic force between the first permanent magnet 58, 158, 258, 458, 558 and the solenoid 56, 156, 256, 456, 556. It will be understood that, in this set of examples, the magnetic force between the first permanent magnet 58, 158, 258, 458, 558 and the solenoid 56, 156, 256, 456, 556 is the magnetic force occurring between the first permanent magnet 58, 158, 258, 458, 558 and a steel core of the solenoid 56, 156, 256, 456, 556 and is not the result of an electromagnetic field generated by the solenoid when energised. If a freefall, over-speed, or over-acceleration condition of the elevator car 16 is detected by the governor 22, the controller 84 is configured to energise the solenoid 56, 156, 256, 456, 556 with a first polarity, such that the first permanent magnet 58, 158, 258, 458, 558 is moved away from the solenoid 56, 156, 256, 456, 556 along the axis 64, 164 from a first axial position to a second axial position by the repulsive magnetic force between the first permanent magnet 58, 158, 258, 458, 558 and the 56, 156, 256, 456, 556. In other words, the safety brake 46, 146, 246, 446, 556 is actuated as a result of the solenoid 56, 156, 256, 456, 556 being switched by the controller 84 from a first state where the solenoid 56, 156, 256, 456, 556 is powered off to a second state where the solenoid 56, 156, 256, 456, 556 is energised with a first polarity. In this set of examples, the solenoid 56, 156, 256, 456, 556 may be energised with a second, opposite polarity by the controller 84 to reset the safety brake 46, 146, 246, 446, 546 and the actuator 52, 152, 252, 452, 552 of the safety brake system 40, 140, 240, 440, 540 from the braking to the non-braking position. In other words, the safety brake system may be reset as a result of the solenoid 56, 156, 256, 456, 556 being switched by the controller 84 from the second state where the solenoid 56, 156, 256, 456, 556 is energised with a first polarity to a third state where the solenoid is energised with a second, opposite polarity to that of the second state. In these examples, after the safety brake 46, 146, 246, 446, 546 and the actuator 52, 152, 252, 452, 552 of the safety brake system 40, 140, 240, 440, 540 are reset, the solenoid may be powered off and thus switched back to the first state by the controller 84 so as to conserve energy. In other alternative examples in which the solenoid is powered off in the first state, the safety brake system may be reset as a result of the solenoid 56, 156, 256, 456, 556 being switched by the controller 84 from the second state where the solenoid 56, 156, 256, 456, 556 is energised with a first polarity to a third state which is the same as the first state in which the solenoid is powered off.

Figure 8:
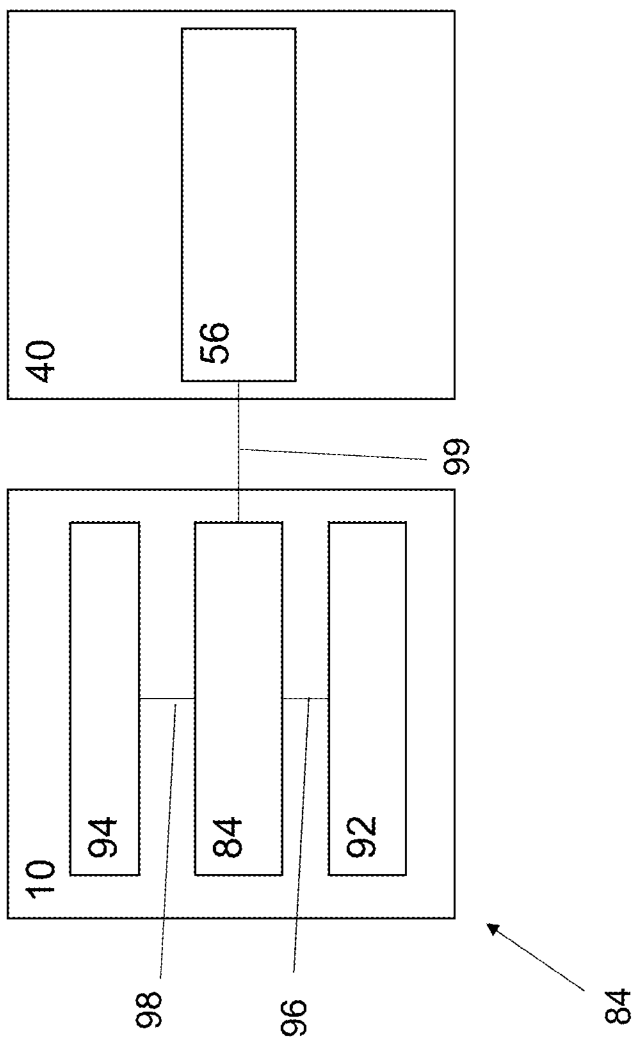
FIG. 8 is a schematic block diagram of emergency braking control for an elevator system and safety brake system according to an example of the disclosure.

FIG. 8 shows a schematic block diagram of emergency braking control for the elevator system 10 and safety brake system 40. The safety brake system is mounted onto the elevator car 16. The elevator system 10 further comprises a speed sensor 92, accelerometer 94 and a controller 84. The speed sensor 92 measures the speed of descent and ascent of the elevator car 16. The accelerometer 94 measures the acceleration of the elevator car 16. The controller 84 is arranged to receive a speed signal 96 from the speed sensor 92, and an acceleration signal 98 from the accelerometer 94, and to control an electrical power supply 99 to the electromagnet 56 in the safety brake system. It will be understood that in this case the electromagnet may also be a solenoid. The controller 84 will selectively reduce, activate or disconnect the electrical power supply 99 to the electromagnet 56 to switch the electromagnet from a first state to a second state, e.g. upon the controller 84 detecting an overspeed condition for the elevator car 16 based on the speed signal 96, and/or upon the controller 84 detecting an over-acceleration condition for the elevator car 16 based on the speed signal 96 and/or the acceleration signal 98.

It will be appreciated by those skilled in the art that the disclosure has been illustrated by describing one or more examples thereof, but is not limited to these examples; many variations and modifications are possible, within the scope of the accompanying claims. For example, the safety brake system may be used in a roped or ropeless elevator system, or another type of conveyance system.

What is claimed is:

1. A safety brake system (40; 140; 240; 440; 540) for use in a conveyance system including a guide rail (20) and a conveyance component moveable along the guide rail, the safety brake system comprising:

a safety brake (46; 146; 246; 346; 446; 546) moveable between a non-braking position where the safety brake is not in engagement with the guide rail and a braking position where the safety brake is engaged with the guide rail;

a linkage mechanism (54; 54*c*; 154; 254; 354; 454; 554); and an actuator (52; 152; 252; 352; 452; 552) for the safety brake, the actuator being configured to be mounted to the conveyance component and comprising:

an electromagnet (56; 156; 256; 356; 456; 556) switchable between a first state and a second state; and an actuation component (58; 158; 258; 358; 458; 558) configured to move relative to the electromagnet from a first position when the electromagnet is in the first state to a second position when the electromagnet is in the second state, wherein the linkage mechanism is coupled between the safety brake and the actuation component such that movement of the actuation component from the first position to the second position when the electromagnet is switched from the first state to the second state is transferred to the safety brake via the linkage mechanism, thus moving the safety brake into the braking position;

wherein the actuator (52; 152; 352; 452; 552) further comprises a biasing member (62; 162; 362; 462; 562) configured to bias the actuation component (58; 158; 358; 458; 558) away from or towards the electromagnet (56; 156; 356; 456; 556);

wherein the biasing member is positioned between the electromagnet and the actuation component.

2. The safety brake system of claim 1, wherein the electromagnet (56; 156; 256; 356; 456; 556) is switchable from the second state to a third state;

wherein the actuation component (58; 158; 258; 358; 458; 558) is configured to move relative to the electromagnet from the second position when the electromagnet is in the second state to the first position when the electromagnet is in the third state; and wherein the linkage mechanism (54; 54*c*; 154; 254; 354; 454; 554) is coupled between the safety brake (46; 146; 246; 346; 446; 546) and the actuation component such that movement of the actuation component from the second position to the first position is transferred to the safety brake via the linkage mechanism, thus moving the safety brake from the braking position to the non-braking position.

3. The safety brake system of claim 1, wherein the electromagnet (56; 156; 256; 356; 456; 556) is configured to be fixed relative to the conveyance component, wherein the actuator (52; 152; 252; 352; 452; 552) further comprises a mount portion (42) for mounting the actuator to the conveyance component, wherein the electromagnet is fixed relative to the mount portion.

4. The safety brake system of claim 1, wherein the actuator (52; 152; 252; 352; 452; 552) further comprises a housing (66; 166; 266; 366; 466; 566), and wherein the housing encloses the electromagnet (56; 156; 256; 356; 456; 556) and the actuation component (58; 158; 258; 358; 458; 558).

5. The safety brake system of claim 1, wherein the safety brake (46; 146; 246; 346; 446; 546) comprises a braking component configured to move into engagement with the guide rail (20) when the safety brake moves to the braking position, wherein the braking component is coupled to the linkage mechanism (54; 54*c* 154; 254; 354; 454; 554) such that the movement of the actuation component (58; 158; 258; 358; 458; 558) from the first position to the second position when the electromagnet (56; 156; 256; 356; 456; 556) is switched from the first state to the second state pushes or pulls the braking component in the direction of movement of the actuation component, thus moving the safety brake into the braking position.

6. The safety brake system of claim 5, wherein the actuator (52; 152; 252; 352; 452; 552) further comprises a safety lever (72; 72*c*; 172; 272; 372; 472; 572), the safety lever being fixed to the actuation component (58; 158; 258; 358; 458; 558) for movement therewith and extending from the electromagnet (56; 156; 256; 356; 456; 556) to the actuation component along a lever axis, wherein the actuation component is configured to move between the first position and the second position along the lever axis.

7. The safety brake system of claim 6, wherein the movement of the actuation component (58; 158; 258; 358; 458; 558) from the first position to the second position when the electromagnet (56; 156; 256; 356; 456; 556) is switched from the first state to the second state pushes or pulls the braking component along a braking axis, wherein the braking axis is in-line with the lever axis, or wherein the braking axis is off-set from the lever axis.

8. The safety brake system of claim 1, wherein the actuator (52; 152; 252; 352; 452; 552) further comprises a safety lever (72; 72*c*; 172; 272; 372; 472; 572), the safety lever being fixed to the actuation component (58; 158; 258; 358; 458; 558) for movement therewith and extending from the electromagnet (56; 156; 256; 356; 456; 556) to the actuation component along a lever axis, wherein the actuation component is configured to move between the first position and the second position along the lever axis.

9. The safety brake system of claim 8, wherein the electromagnet is a solenoid (56; 156; 256; 346; 456; 556) and wherein the actuation component is a first permanent magnet (58; 158; 258; 458; 558).

10. The safety brake system of claim 9 wherein the first magnet is attracted towards the solenoid when the solenoid is in the first state and repulsed away from the solenoid when the solenoid is in the second state.

11. The safety brake system of claim 1, wherein the electromagnet is a solenoid (56; 156; 256; 346; 456; 556) and wherein the actuation component is a first permanent magnet (58; 158; 258; 458; 558).

12. The safety brake system of claim 1, wherein the actuation component (358) comprises a ferromagnetic material, wherein in the first state the electromagnet (356) attracts the actuation component to the electromagnet, and wherein in the second state, the electromagnet does not attract the actuation component to the electromagnet.

13. The safety brake system of claim 1, wherein the actuation component (358) comprises a ferromagnetic material, wherein in the first state, the electromagnet does not attract the actuation component to the electromagnet, and wherein in the second state, the electromagnet attracts the actuation component to the electromagnet.

14. An elevator system, the elevator system comprising:

an elevator car (16) driven to move along at least one guide rail (20); and the safety brake system (40; 140; 240; 440; 540) of claim 1, wherein the electromagnet (56; 156; 256; 356; 456; 556) is fixed relative to the elevator car and the safety brake (46; 146; 246; 346; 446; 546) is arranged to be moveable between the non-braking position where the safety brake is not in engagement with the guide rail and the braking position where the safety brake is engaged with the guide rail.

15. The elevator system of claim 14, further comprising:

a speed sensor (92) and a controller (84) arranged to receive a speed signal from the speed sensor and to selectively switch the electromagnet (56; 156; 256; 356; 456; 556) from the first state to the second state upon detecting an overspeed or over-acceleration condition for the elevator car (16) based on the speed signal; and/or an accelerometer (94) and a controller (84) arranged to receive an acceleration signal from the accelerometer and to selectively switch the electromagnet from the first state to the second state upon detecting an over-acceleration condition for the elevator car.

16. A method of operating a safety brake in a safety brake system, the safety brake system (40; 140; 240; 440; 540) comprising:

a safety brake (46; 146; 246; 346 446; 546) moveable between a non-braking position where the safety brake is not in engagement with a guide rail and a braking position where the safety brake is engaged with the guide rail;

a linkage mechanism (54; 54*c* 154; 254; 354; 454; 554); and an actuator (52; 152; 252; 352; 452; 552) for the safety brake, the actuator being mounted to the conveyance component and comprising:

an electromagnet (56; 156; 256; 356; 456; 556) switchable between a first state and a second state; and an actuation component (58; 158; 258; 358; 458; 558) configured to move relative to the electromagnet between a first position when the electromagnet is in the first state and a second position when the electromagnet is in the second state;

wherein the actuator further comprises a biasing member (62; 162; 362; 462; 562) configured to bias the actuation component away from or towards the electromagnet;

wherein the biasing member is positioned between the electromagnet and the actuation component, the method comprising:

operating the electromagnet in an emergency stop mode to move the actuation component from the first position to the second position, wherein the linkage mechanism is coupled between the safety brake and the actuation component such that the movement of the actuation component from the first position to the second position is transferred to the safety brake via the linkage mechanism, thus moving the safety brake into the braking position.

17. The method of claim 16, further comprising:

detecting an overspeed or over-acceleration of the conveyance component; and initiating the emergency stop mode by switching the electromagnet (56; 156; 256; 356; 456; 556) from the first state to the second state.

* * * * *